US007153574B2

(12) United States Patent
Qi et al.

(10) Patent No.: US 7,153,574 B2
(45) Date of Patent: Dec. 26, 2006

(54) SURFACE GRAFTED METAL OXIDE PARTICLES AND COMPOSITIONS COMPRISING THE SAME

(75) Inventors: Yu Qi, Oakville (CA); Nan-Xing Hu, Oakville (CA); Ah-Mee Hor, Mississauga (CA); Hidemi Nukada, Minamiashigara (JP); Hirofumi Nakamura, Minamiashigara (JP)

(73) Assignees: Xerox Corporation, Stamford, CT (US); Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/892,384

(22) Filed: Jul. 16, 2004

(65) Prior Publication Data

US 2006/0014020 A1 Jan. 19, 2006

(51) Int. Cl.
*B32B 5/16* (2006.01)

(52) U.S. Cl. ..................... 428/403; 346/135.1; 430/56; 430/58.4; 430/346; 428/323

(58) Field of Classification Search .................. 430/56, 430/58.4, 346; 428/403, 323; 346/135.1
See application file for complete search history.

(56) References Cited

U.S. PATENT DOCUMENTS 4,264,695 A * 4/1981 Kozima et al. .......... 430/58.25
4,265,990 A 5/1981 Stolka et al.
4,298,697 A 11/1981 Baczec et al.
4,338,390 A 7/1982 Lu
4,560,635 A 12/1985 Hoffend et al.
4,778,671 A * 10/1988 Wusirika ................. 423/592.1
5,446,011 A * 8/1995 Hayakawa et al. ......... 503/209
5,891,594 A 4/1999 Yuh et al.
5,958,638 A 9/1999 Katayama et al.
6,277,535 B1 8/2001 Liu et al.
6,284,421 B1 * 9/2001 Matsuzaki et al. ....... 430/111.1
6,455,222 B1 * 9/2002 Fukino et al. ........... 430/270.1
6,623,655 B1 * 9/2003 Kappel et al. ................. 252/1
6,773,857 B1 * 8/2004 Nakamura et al. ............ 430/65
6,921,618 B1 * 7/2005 Hongo et al. .............. 430/59.1

OTHER PUBLICATIONS

Grant & Hackh's Chemical Dictionary, Fifth edition, p. 268, 1987.*

* cited by examiner

*Primary Examiner*—Hoa T. Le
(74) *Attorney, Agent, or Firm*—Oliff & Berridge, PLC

(57) ABSTRACT

A composition includes a metal oxide particle, which can optionally be surface treated by a silane coupling agent, and an electron acceptor surface grafted to the metal oxide particle.

18 Claims, No Drawings

SURFACE GRAFTED METAL OXIDE PARTICLES AND COMPOSITIONS COMPRISING THE SAME

BACKGROUND OF THE INVENTION

1. Field of Invention

This invention is generally directed to surface grafted metal oxide particles, particularly semi-conductive zinc oxide, titanium oxide or tin oxide particles, and preparation thereof. More specifically, this invention is directed to surface grafted metal oxide particles that are grafted with electron acceptor, such as anthraquinone-containing electron acceptor. The invention is also directed to methods for preparing such surface grafted metal oxide particles, as well as to compositions including such surface grafted metal oxide particles and methods of making such compositions.

2. Description of Related Art

In electrophotography, an electrophotographic imaging member, also commonly referred to as a photoreceptor, containing a photoconductive layer on a conductive layer, is imaged by first uniformly electrostatically charging the surface. The substrate is then exposed to a pattern of activating electromagnetic radiation, such as light. The light or other electromagnetic radiation selectively dissipates the charge in the illuminated areas of the photoconductive insulating layer while leaving behind an electrostatic latent image in the non-illuminated areas. This electrostatic latent image may then be developed to form a visible image by depositing finely divided electrostatically charged marking particles, generally referred to as toner particles, on the surface of the photoconductive layer. The resulting visible image may then be transferred from the electrophotographic imaging member to a support such as paper. This image developing is repeated as many times as necessary with reusable photoconductive layers.

An electrophotographic imaging member may take one of many different forms. For example, layered photoresponsive imaging members are known in the art. U.S. Pat. No. 4,265,990, which is incorporated herein by reference in its entirety, describes an exemplary layered photoreceptor having separate photogenerating and charge transport layers. The photogenerating layer is capable of photogenerating holes and injecting the photogenerated holes into the charge transport layer.

More advanced photoreceptors contain highly specialized component layers. For example, a multilayered photoreceptor that can be employed in electrophotographic imaging systems can include a substrate, a charge blocking undercoating layer, a charge generating layer (including photogenerating material in a binder) over the undercoating layer, and a charge transport layer (including charge transport material in a binder). Additional layers such as an overcoating layer or layers can also be included.

The photoconductors currently used are susceptible to carrier injection from the substrate into the photosensitive layer such that the charge on the surface of the photoconductor may be microscopically dissipated or decayed. This can result in production of a defective image. The interposition of an undercoating layer between the substrate and the photosensitive layer has been suggested to overcome this problem, and improve the chargeability of the photoconductor and enhance adhering and coating properties of the photosensitive layer with respect to the substrate.

U.S. Pat. No. 5,958,638, which is incorporated herein by reference in its entirety, discloses known materials used for undercoat layers. For example, such materials have included a resin material alone, such as polyethylene, polypropylene, polystyrene, acrylic resin, vinyl chloride resin, vinyl acetate resin, polyurethane, epoxy resin, polyester, melamine resin, silicone resin, polyvinyl butyryl, polyamide and copolymers containing two or more of repeated units of these resins. The resin materials further have included casein, gelatin, polyvinyl alcohol, ethyl cellulose, etc.

The undercoat layers are typically formed by a dip coating method. See, for example, U.S. Pat. Nos. 5,958,638 and 5,891,594.

In photoreceptors of the above type, the photogenerating material generates electrons and holes when subjected to light. In the case of a hole blocking undercoating layer, the undercoating layer prevents holes in the conductive ground plane from passing into the photogenerator from which they would be conducted to the photoreceptor surface, thus dissipating the surface charge of the photoconductor. The undercoating layer does permit electrons generated in the photogenerator to pass to the conductive ground plane, preventing an undesirably high electric field from building up across the generator upon repeated usage or cycling of the photoconductive imaging member.

U.S. Pat. No. 6,277,535, which is incorporated herein by reference in its entirety, discloses an electrophotographic imaging member includes a supporting substrate, an undercoating layer, an optional adhesive layer, a photogenerating layer, and a charge transporting layer. The undercoating layer is derived from the reaction of a silyl-functionalized polymer with a silane coupling agent and an optional second silane coupling agent. The imaging members are described to provide improved operational performance.

SUMMARY OF THE INVENTION

Despite the above and other photoconductor and imaging member designs, a need continues to exist in the art for electrophotographic imaging members, and processes for making such imaging members, that provide improved operational performance. The present invention meets these needs.

For example, a current problem in electrophotographic imaging member design is excessive charge accumulation at the interface between the undercoating layer and the charge generating layer. This charge accumulation may result in electrical problems, for example, increased residual potential under stressful mode cycling test. Improvement of such problems, by lessening of charge accumulation, will in turn result in improved print and image performance.

This invention, in embodiments, addresses the above problems by providing surface grafted metal oxide particles, particularly semi-conductive zinc oxide, titanium oxide or tin oxide particles. The metal oxide particles, in embodiments, are grafted with electron acceptor, such as anthraquinone-containing electron acceptor. The invention also provides methods for preparing such surface grafted metal oxide particles, composition including such surface grafted metal oxide particles, as well as to methods of making such compositions.

In particular, the present invention provides a composition, comprising: a metal oxide particle; and an electron acceptor surface grafted to the metal oxide particle. The present invention provides a polymer composition comprising: the composition described above, and a polymeric binder.

In other embodiments, the present invention provides a process for making a composition, comprising: providing a metal oxide particle; and surface grafting an electron acceptor to the metal oxide particle.

In still other embodiments, the present invention provides a process for making a polymer composition, comprising: providing a metal oxide particle having an electron acceptor surface grafted thereto; and dispersing said metal oxide particle in a polymeric binder.

DETAILED DESCRIPTION OF PREFERRED EMBODIMENTS

The present invention, in embodiments, provides compositions, polymeric compositions, and methods of making such compositions and polymeric compositions. The compositions generally include surface-modified metal oxide particles, where the surface modification includes at least grafting an electron acceptor, and in embodiments can include both a silane coupling agent surface treatment and an electron acceptor surface modification. The compositions can be incorporated, for example, into polymeric binders to form polymeric compositions. These compositions can, in turn, be used in a variety of applications such as for undercoating layers of electrographic imaging members.

The metal oxide used as the primary particle in forming the surface grafted particles can be any suitable metal oxide material. For example, the metal oxide can suitably be selected from, but is not limited to, zinc oxide, titanium oxide, tin oxide, zirconium oxide, mixtures thereof, and the like.

According to embodiments of the present invention, any suitable sized metal oxide particles can be used. Preferably, the metal oxide particles are in the nanoparticle size range, although the invention is not limited to such sized particles. Thus, while the following discussion may focus upon metal oxide nanoparticles, it is understood that larger (or smaller) sized metal oxide particles can readily be used. For example, in embodiments, it is desired that the metal oxide particles have an average particle size of from about 1 nm to about 500 nm, more preferably from about 5 nm to about 250 nm.

Preferably, the metal oxide particles are first surface treated with an organic silane compound or silane coupling agent, according to processes known in the art, before being surface grafted with the electron acceptor. For example, the metal oxide particles can be suitably surface treated by an organic silane compound, such as compounds represented by the following formula:

$$(R)_nSi(X)_{4-n}$$

wherein R is at least one selected from the group consisting of a $C_1$–$C_{30}$ hydrocarbyl including an alkyl, an aryl, a vinyl and the like, wherein said hydrocarbyl may further contain halogen, nitrogen, oxygen, and sulfur atom; and illustrative examples of R group include, but not limited to, methyl, ethyl, propyl, octyl, phenyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group and the like. X, which is a hydrolyzable functional group, is a $C_1$–$C_{20}$ alkoxy group or halogen or hydrogen atom n is a integer selected from 1, 2, and 3. Illustrative examples of such suitable silane agents according to the above formula include, but are not limited to, methyltrichlorosilane, dimethyldichlorosilane, methyltrimethoxysilane, methyltriethoxysilane, ethyltrichlorosilane, ethyltrimethoxysilane, dimethyldimethoxysilane, methyltriethoxysilane, ethyltriethoxysilane, propyltrimethoxysilane, 3-aminopropyltrimethoxysilane, 3-aminopropyltriethoxysilane, aminoethylaminopropyltrimethoxysilane and the like.

Examples of the organic silane compound include, but are not limited to, one or more selected from the group consisting of 3-glycidoxypropyl trimethoxysilane (Z-6040, available from Dow Corning; KBM 403, available from Shin-Etsu), methyltrimethoxysilane (Z-6070, available from Dow Corning; KBM 13, available from Shin-Etsu), methacryloxypropyltrimethoxysilane (Z-6030, available from Dow Corning; KBM502, available from Shin-Etsu), aminopropyltrimethoxysilane (Z-6011, available from Dow Coming; KBM903, available from Shin-Etsu), aminoethylaminopropyltrimethoxysilane (KBM603, available from Shin-Etsu), trifluoropropyltrimethoxysilane (KBM7103, available from Shin-Etsu), heptadecafluorodecyltrimethoxysilane (KBM7803, available from Shin-Etsu), isocyanatopropyltriethoxysilane (KBE9007, available from Shin-Etsu), aminopropyltriethoxysilane (KBE903, available from Shin-Etsu), and aminoethylaminopropyltriethoxysilane (KBE603, available from Shin-Etsu). In embodiments, the organic silane compound aminoethylaminopropyltrimethoxysilane (KBM603, available from Shin-Etsu) is particularly preferred.

In embodiments, the metal oxide particles are pre-treated with the organic silane compound in any suitable loading amount, based on the desired results. For example, suitable loading amounts can range from about 0.01 to about 30% or more, although loading amounts of from about 0.05 or about 0.1 to about 10.0 or about 5.0, are preferred, where the loading amount is weight of organic silane compound based on weight of the metal oxide.

The metal oxide particles can be pre-treated with the organic silane compound or silane coupling agent by any suitable manner, including those well known in the art. For example, in one embodiment, the metal oxide particles can be pre-treated with the organic silane compound by dispersing the metal oxide particles and the organic silane compound in a suitable solvent, such as an organic solvent. Organic solvents suitable for affecting the dispersion include, but are not limited to, tetrahydrofuran, methanol, ethanol, methyl ethyl ketone, acetone, toluene, mixtures thereof, and the like. Dispersion can be further assisted by conventional methods, including but not limited to, sonication, stirring, homogenizing, elevated temperature, and the like. In some embodiments, dispersion is affected by first dispersing the materials in the solvent by sonication, followed by stirring at elevated temperature. For example, stirring at elevated temperatures can be conducted for between about 10 minutes and about 12 hours or more, at temperatures of from about 20 or about 25 to about 100 or about 200° C. Of course, temperatures and times outside of these ranges can be used, if desired.

The metal oxide particles are then suitably surface grafted with an electron acceptor. Although not limited to any particular theory, it is believed that preferred surface grafting occurs by metal chelation of the electron acceptor containing a chelating group, such as an enediol-containing electron acceptor, to the metal oxide particles. Other suitable chelating group includes, but not limited to, hydroxyl, amino, carboxylic acid and the like.

In embodiments, any suitable electron acceptor can be used for surface grafting to the metal oxide particles. For example, suitable electron acceptor include enediol-containing electron acceptors and anthraquinone-type compounds. Particularly preferred electron acceptors, in embodiments, include but are not limited to anthraquinone-type compounds having a chelating group, such as hydroxyl, amino, carboxylic acid and the like. Illustrative examples of such anthraquinone compounds include, but not limited to, alizarin, quinizarin, anthrarufin, purpurin, anthraflavic acid, mixtures thereof, and the like.

The electron acceptor can be surface grafted to the metal oxide particles by any suitable manner. For example, in one embodiment, the electron acceptor can by surface grafted to the metal oxide particles by dispersing the metal oxide particles and the electron acceptor in a suitable solvent, such as an organic solvent. Organic solvents suitable for affecting the dispersion include, but are not limited to, tetrahydrofuran, methanol, ethanol, methyl ethyl ketone, toluene, acetone, mixtures thereof, and the like. Dispersion can be further assisted by conventional methods, including but not limited to, sonication, stirring, homogenizing, elevated temperature, and the like. In some embodiments, dispersion is affected by first dispersing the materials in the solvent by sonication, followed by stirring at elevated temperature. For example, stirring at elevated temperatures can be conducted for between about 10 minutes and about 12 hours or more, at temperatures of from about 20 or about 25 to about 100 or about 150° C. Of course, temperatures and times outside of these ranges can be used, if desired.

In another embodiment of the present invention, the surface modified metal oxide particles can also be prepared by treating the metal oxides particles in the presence of both the silane coupling agent and the electron acceptor in a similar process manner described herein.

Once surface grafting of the electron acceptor to the metal oxide particles has been completed to the desired amount, the resultant particles can be collected by any conventional means. For example, the resultant particles can be recovered from the solvent by centrifugation or the like. Optional washing processes, using an organic solvent, can be used to remove any uncomplexed electron acceptor from the complexed particles, if desired. The resultant particles can also subsequently be dried, if desired.

In embodiments, the electron acceptor is complexed to the metal oxide particles in any suitable loading amount, based on the desired results. For example, suitable loading amounts can range from about 0.01 to about 30% or more, although loading amounts of from about 0.05 or about 0.1 to about 10.0 or about 5.0, are preferred, where the loading amount is weight of electron acceptor based on weight of the metal oxide.

Once the surface grafted metal oxide particles are formed, they can be used as is, or they can be incorporated into a variety of other compositions to provide desired properties.

For example, in embodiments of the present invention, the surface grafted metal oxide particles can be used in forming polymer compositions. Such compositions can include, for example, the surface grafted metal oxide particles and a polymeric binder, where the surface grafted metal oxide particles are preferably dispersed in the polymeric binder. In these embodiments, the polymeric binder can be suitably selected from the known polymeric binders based on the intended future use of the composition. Although not limited thereto, the polymeric binder can be selected from, for example, polyvinylbutyrals, polyvinyl alcohols, polyurethanes, polyamides, polycarbonates, polyesters, mixtures thereof, and the like. The polymeric compositions can include one or more additional optional additives, if desired, such as crosslinking agents, catalysts, antioxidants, colorants, fillers, and the like.

In one particular embodiment of the invention, the surface grafted metal oxide particles are advantageously incorporated into an undercoating or other desired layer of an imaging member or other structure. The surface grafted metal oxide particles can be incorporated into such imaging members or other structures by conventional processes, known in the art. For example, the surface grafted metal oxide particles can be mixed with a suitable binder material, a curing agent, and a catalyst, optionally in a suitable solvent, and applied and cured to a substrate to form an undercoating layer.

In an exemplary embodiment of an electrophotographic imaging member in accordance with this invention, the imaging member includes a substrate; an undercoating layer formed on the substrate; and a photoconductor layer formed on the undercoating layer, comprising a photogenerating layer (charge generating layer) and a charge transport layer. Other optional layers, such as an adhesive layer and/or a surface layer, may also be included, as desired.

The undercoating layer is generally located between the substrate and the photosensitive layer, although additional layers may be present and located between these layers. According to the present invention, the undercoating layer is formed by mixing a conductive or semi-conductive material with a binder material, a curing agent and a catalyst, in a solvent. The conductive or semi-conductive material is a surface grafted metal oxide nanoparticle, described above, formed by surface grafting an enediol-containing electron acceptor onto the surface of a metal oxide nanoparticle.

While the undercoating layer of this invention can be produced to any suitable thickness, in embodiments of this invention, the undercoating layer is from about 1 to about 40 μm thick, preferably from about 3to about 25 μm thick.

A particularly advantageous use of the surface grafted metal oxide particles is in forming an undercoating layer in a photoconductive imaging member. Incorporation of the surface grafted metal oxide particles in an undercoating layer of a photoconductive imaging member has been found, in embodiments, to improve carbon fiber resistance, reduce charge accumulation between the undercoating layer and a charge generating layer, and provide improved print and imaging performance.

When used in a photoconductive member, the structure of the photoconductive member according to the present invention can follow any of various known photoreceptor designs, modified to include the above-described undercoating layer. Because such photoreceptor designs are well known in the art, the remaining layers of the photoreceptor will be described only in brief detail for completeness.

In embodiments of this invention, a photoconductive imaging member comprises the following sequence of layers: a supporting substrate, an undercoating layer, an adhesive layer, a photogenerating layer and a charge transport layer.

Also, in embodiments of this invention, the supporting substrate can comprise a conductive metal substrate. In embodiments, the conductive substrate can be, for example, aluminum, aluminized or titanized polyethylene terephthalate belt (MYLAR®).

In embodiments, the photogenerator layer can have any suitable thickness, such as a thickness of from about 0.05 to about 10 microns. In embodiments, the transport layer can have a thickness of from about 10 to about 50 microns. In embodiments, the photogenerator layer can comprise photogenerating pigments dispersed in a resinous binder in an amount of from about 5 percent by weight to about 95 percent by weight. In embodiments, the resinous binder can be any suitable binder, such as selected from the group consisting of polyesters, polyvinyl butyrals, polycarbonates, polystyrene-b-polyvinyl pyridine, and polyvinyl formals.

In embodiments, the charge transport layer can comprise aryl amine molecules. In embodiments, the aryl amines can be of the following formula:

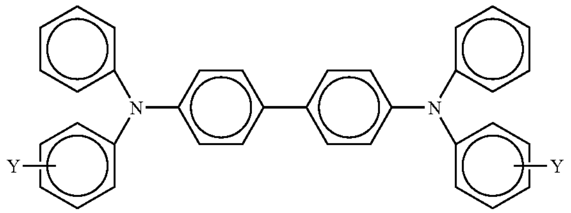

wherein Y selected from the group consisting of alkyl and halogen, and wherein the aryl amine is dispersed in a highly insulating and transparent resinous binder. In embodiments, the arylamine alkyl contains from about 1 to about 10 carbon atoms. In embodiments, the arylamine alkyl contains from 1 to about 5 carbon atoms. In embodiments, the arylamine alkyl is methyl, wherein halogen is chlorine, and wherein the resinous binder is selected from the group consisting of polycarbonates and polystyrenes. In embodiments, the aryl amine is N,N'-diphenyl-N,N-bis(3-methyl phenyl)-1,1'-biphenyl-4,4'-diamine.

In embodiments, the photoconductive imaging member can also include an adhesive layer of a polyester with an $M_w$ of preferably about 70,000, and an $M_n$ of from about 25,000 to about 50,000, and preferably about 35,000.

In embodiments, the photogenerating layer is comprised of metal phthalocyanines, metal free phthalocyanines. In embodiments, the photogenerating layer is comprised of titanyl phthalocyanines, perylenes, or hydroxygallium phthalocyanines. In embodiments, photogenerating layer is comprised of Type V hydroxygallium phthalocyanine.

Embodiments of this invention can include a method of imaging which comprises generating an electrostatic latent image on the imaging member, developing the latent image, and transferring the developed electrostatic image to a suitable substrate.

In embodiments of this invention the imaging members comprise a supporting substrate, a cured undercoating layer; thereover a photogenerating layer of, for example, hydroxygallium phthalocyanine, and a charge transport layer.

Optionally, an overcoat layer can be utilized to improve resistance to abrasion. Also optionally, a back coating may be applied to the side opposite the imaging side of the photoreceptor to provide flatness and/or abrasion resistance. These overcoat and back coat layers can include any suitable composition, such as, for example, organic polymers or inorganic polymers that are electrically insulating or slightly semi-conductive.

Photoreceptors including undercoating layers incorporating the surface grafted metal oxide particles of the present invention show excellent electrical properties with low dark decay, low voltage residue, and high photosensitivity.

Also, included within the scope of the present invention are methods of imaging and printing with the photoresponsive devices illustrated herein. These methods generally involve the formation of an electrostatic latent image on the imaging member; followed by developing the image with a toner composition comprised, for example, of thermoplastic resin, colorant, such as pigment, charge additive, and surface additives, reference U.S. Pat. Nos. 4,560,635, 4,298,697 and 4,338,390, the disclosures of which are totally incorporated herein by reference; subsequently transferring the image to a suitable substrate; and permanently affixing the image thereto. In those environments wherein the device is to be used in a printing mode, the imaging method involves the same steps with the exception that the exposure step can be accomplished with a laser device or image bar.

The following Examples are being submitted to illustrate embodiments of the present invention. These Examples are intended to be illustrative only and are not intended to limit the scope of the present invention. Also, parts and percentages are by weight unless otherwise indicated. Comparative Examples and data are also provided.

EXAMPLES

Example 1

Synthesis of Surface Grafted Zinc Oxide Particles

Zinc oxide particles having an average particle size of about 70 nanometer (40 g) and alizarin (0.4 g) are sonicated in tetrahydrofuran (400 g). This is followed by heating and stirring the dispersion at about 55° C. for 12 hours. After the surface treatment, the excess surface treatment agents are removed by washing with an organic solvent. The isolated particles are dried at about 100° C. for 12 hours. The presence of alizarin on zinc oxide particles is confirmed by FTIR and TGA analysis.

Example 2

Synthesis of Surface Grafted Zinc Oxide Particles

Zinc oxide particles with average particle size of 70 nanometers surface pre-treated with aminoethylaminopropyltrimethoxysilane (KBM603, available from Shin-Etsu) are further treated with alizarin in solution to make alizarin surface anchored zinc oxide particles. In this Example, 0.5% loading of alizarin is used to treat the zinc oxide particles by mixing 40 g of zinc oxide with 0.2 g of alizarin in 400 mL of tetrahydrofuran (THF), following with sonicating the resulting purple slurry to ensure uniform dispersion. The dispersion is heated at about 55° C. for 12 hours. The particles are isolated by centrifugeration. The resulting particles are washed with THF 2 times and are dried at 110° C. for 16 hours, and cooled to room temperature. The presence of alizarin on zinc oxide particles is confirmed by thermogravimetric analysis (TGA) and FTIR.

Examples 3–6

Synthesis of Surface Grafted Zinc Oxide Particles

Example 2 is repeated using different alizarin loading levels. Specifically, alizarin loading levels of 1.0%, 1.5%, 2.5% and 2.0% are used to form surface grafted zinc oxide particles.

The results of Examples 1 to 5 generally demonstrate that the alizarin grafted on the zinc oxide surface is generally saturated at a loading of about 2.0%.

While this invention has been described in conjunction with specific embodiments described above, it is evident that many alternatives, modifications and variations will be apparent to those skilled in the art.

Accordingly, the preferred embodiments of the invention, as set forth above, are intended to be illustrative and not limiting. Various changes may be made without departing from the spirit and scope of the invention.

What is claimed is:

1. A composition, comprising:

a metal oxide particle; and an electron acceptor;

wherein the electron acceptor (1) contains a chelating group selected from the group consisting of hydroxyl groups, amino groups, carboxylic acid groups and mixtures thereof, (2) is grafted by metal chelation to a surface of the metal oxide particle, and (3) is a hydroxyanthraquinone selected from the group consisting of alizarin, quinizarin, anthrarufin, anthraflavic acid, and purpurin.

2. The composition of claim 1, wherein the metal oxide particle has been surface treated with a silane coupling agent.

3. The composition of claim 2, wherein said silane coupling agent is present in an amount of from about 0.01 to about 10% by weight of the metal oxide.

4. The composition of claim 2, wherein said silane coupling agent is a compound of the formula:

$$(R)_n Si(X)_{4-n}$$

wherein R is a hydrocarbyl group of $C_1$ to about $C_{30}$, wherein said hydrocarbyl may further contain halogen, nitrogen, oxygen, and sulfur atom; X is a hydroxyl or a hydrolyzable functional group selected from a group consisting of a $C_1$–$C_{20}$ alkoxy group, halogen, or hydrogen atom, and n is a integer selected from 1, 2, and 3.

5. The composition of claim 4, wherein said R is selected from the group consisting of methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group.

6. The composition of claim 2, wherein said silane coupling agent is selected from the group consisting of methyltrichlorosilane, dimethyldichlorosilane, methyltrimethoxysilane, methyltriethoxysilane, ethyltrichlorosilane, ethyltrimethoxysilane, dimethyldimethoxysilane, methyltriethoxysilane, ethyltriethoxysilane, propyltrimethoxysilane, 3-aminopropyltrimethoxysilane, 3-aminopropyltriethoxysilane, 3-glycidoxypropyl trimethoxysilane, methacryloxypropyltrimethoxysilane, aminopropyltrimethoxysilane, aminoethylaminopropyltrimethoxysilane, trifluoropropyltrimethoxysilane, heptadecafluorodecyltrimethoxysilane, isocyanatopropyltriethoxysilane, aminopropyltriethoxysilane, and aminoethylaminopropyltriethoxysilane.

7. The composition of claim 1, wherein said metal oxide is selected from the group consisting of zinc oxide, titanium oxide, tin oxide, and zirconium oxide.

8. The composition of claim 1, wherein said electron acceptor is present in an amount of from about 0.01 to about 10% by weight of the metal oxide.

9. A polymer composition comprising:

the composition of claim 1; and a polymeric binder.

10. The polymer composition of claim 9, wherein the polymeric binder is selected from the group consisting of polyvinylbutyrals, polyvinyl alcohols, polyurethanes, polyamides, polycarbonates, polyesters, phenol resin and mixtures thereof.

11. The polymer composition of claim 9, wherein the composition further contains a crosslinking agent selected from the group consisting of diisocyanate, and blocking diisocyanate.

12. An electrophotographic imaging member undercoat layer, comprising the composition of claim 1.

13. An electrophotographic imaging member, comprising:

a support layer, a charge generation layer, a charge transport layer, and an undercoat layer comprising the composition of claim 1.

14. A process cartridge comprising the electrophotographic imaging member of claim 13 and at least one of a developing unit and a cleaning unit.

15. An image forming apparatus comprising at least one charging unit, at least one exposing unit, at least one developing unit, a transfer unit, a cleaning unit, and the electrophotographic imaging member of claim 13.

16. A metal oxide composition comprising metal oxide particles that are grafted by metal chelation on a surface thereof with an aminoalkylsilane and a hydroxyanthraquinone selected from the group consisting of alizarin, quinizarin, anthrarufin, anthraflavic acid, and purpurin.

17. The metal oxide composition of claim 16, wherein said aminoalkylsilane is selected from the group of 3-aminopropyltrimethoxysilane, 3-aminopropyltriethoxysilane, aminopropyltrimethoxysilane, aminoethylaminopropyltrimethoxysilane, aminopropyltriethoxysilane, and aminoethylaminopropyltriethoxysilane.

18. The metal oxide composition of claim 16, wherein said aminoalkylsilane is present in an amount of from about 0.1 to about 10% by weight of the metal oxide and wherein said hydroxyanthraquinone is present in an amount of from about 0.1 to about 5% by weight of the metal oxide.

* * * * *